Dec. 9, 1941.                    G. MILLER                      2,265,970
                    TWO WAY PLOW ATTACHMENT FOR TRACTORS
                         Filed Nov. 25, 1939            2 Sheets-Sheet 1
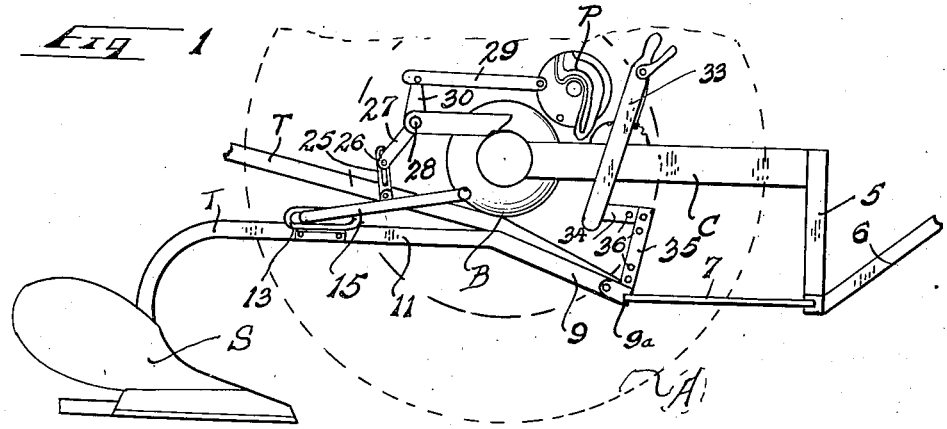
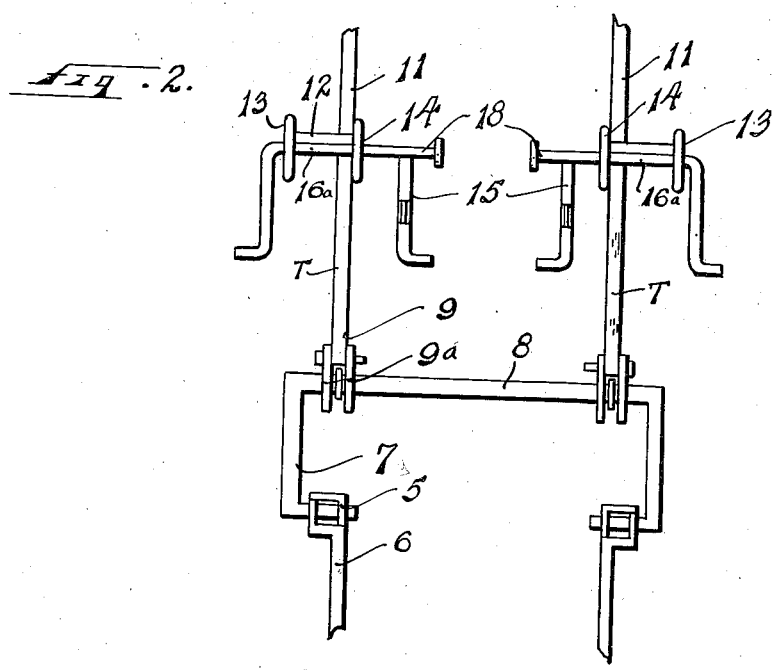
Inventor
Gottlieb Miller
By R. M. Thomas
Attorney Dec. 9, 1941.  G. MILLER  2,265,970
TWO WAY PLOW ATTACHMENT FOR TRACTORS
Filed Nov. 25, 1939  2 Sheets—Sheet 2
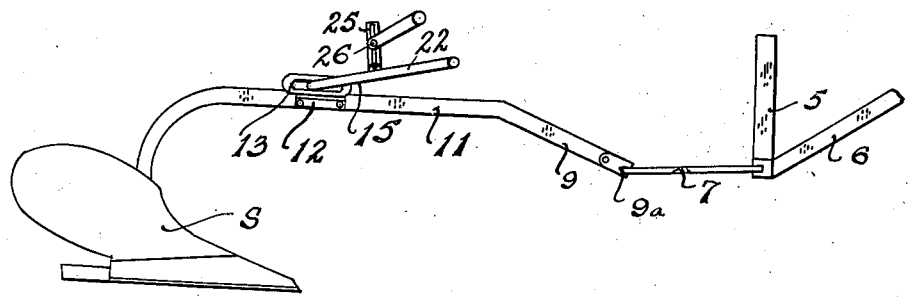
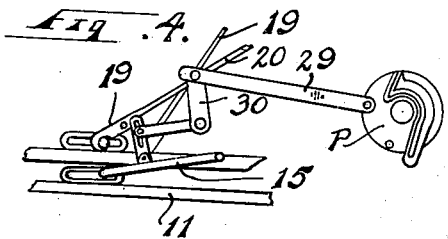
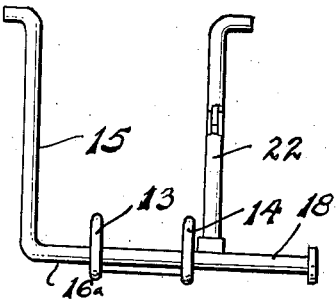
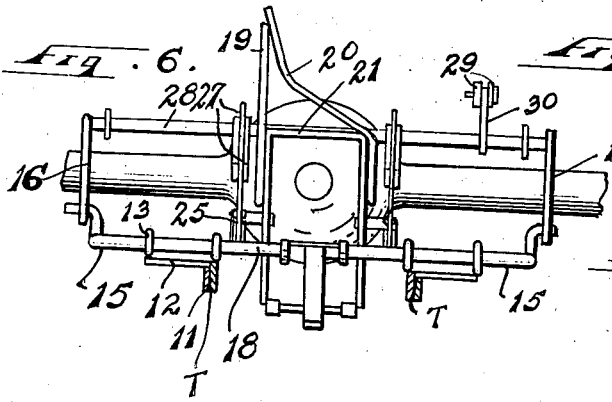
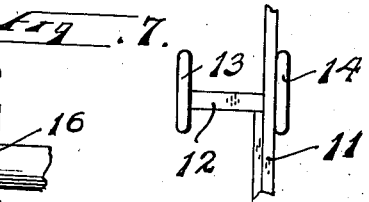
Inventor
Gottlieb Miller
By R. M. Thomas
Attorney Patented Dec. 9, 1941

2,265,970

UNITED STATES PATENT OFFICE 2,265,970

TWO WAY PLOW ATTACHMENT FOR TRACTORS

Gottlieb Miller, Price, Utah

Application November 25, 1939, Serial No. 306,131

1 Claim. (Cl. 97—50)

My invention relates to plows and has for its object to provide a new and highly efficient two-way plow attachment for tractors which enables the person owning the tractor to use it as a two-way plow as well as for other uses.

A still further object is to provide a two-way plow which is adapted to be attached to tractors and which is provided with a lift adapted to raise the plow from the ground at the end of a furrow.

A still further object is to provide a tractor plow of the two-way type which is simplified in construction, economical to manufacture and fool-proof in its operation, so that anyone can use it when attached to a tractor, and also which plow is so made that there are few moving parts, and therefore little replacement of parts ever required giving long life and durability.

These objects I accomplish with the device illustrated in the accompanying drawings in which similar numerals and letters of reference indicate like parts throughout the several views and as described in the specification forming a part of this application and pointed out in the appended claims.

In the drawings,

Figure 1 is a side elevation of the device shown in connection with the drive shaft of a tractor with the wheel of the tractor shown in dotted lines.

Figure 2 is a plan view of the plow mountings for the plows as viewed from above when removed from the tractor.

Figure 3 is a side elevation of one plow removed from the tractor showing the essential working parts thereof.

Figure 4 shows the plow beams and lifting means for the two plows.

Figure 5 is a plan view of one of the U-shaped plow control members.

Figure 6 is a rear view, parts cut away, of the tractor axle showing the mounting for the two plows.

Figure 7 is a view of the control loops of the plow beams.

Figure 8 is a side view of the control loops.

In the drawings, I have shown the tractor wheels only diagrammatically or by dotted lines A and the drive shaft housing is shown as B with the frame shown as C.

Depending from the frame C I provide a forward hitch bar 5 on each side of the tractor frame and braced by angle braces 6 extending forwardly and upwardly to the frame C. Through these two depending hitch bars 5 I mount a U-shaped draw bar 7 having the ends of the legs of the bar bent inwardly and secured pivotally in the bottom end of the bars 5. The base 8 of the draw bar 8 has the end 9 of the plow beam T pivotally attached thereto by clevises 9a. The plow beams T are identical and have their forward end bent down slightly at 10 and their rear ends curved down to which the plows S are attached in the usual manner.

Medially of the straight portion 11 of the plow beams I mount control loops shown in detail in Figures 7 and 8. These control loops consist of a flat base 12 secured to the plow beam and spaced apart oblong loops 13 and 14 secured to the top side of the base 12, and these are elongated loops to permit raising and lowering of the plow and beam from the soil and preventing the plow from tilting when in use.

Depending brackets 16 are provided at the rear of the axle or drive shaft housing B in which U-shaped lifting members 15 have their legs pivotally mounted by turning the ends of the legs outwardly to provide a pivot portion. The base 16a of each member 15 is extended inwardly at 18 to provide a bar onto which the locking levers 19 and 20 may be engaged when either or both of the plows are elevated from the ground. The levers 19 and 20 are mounted to the frame work 21 at the rear of the tractor, as shown fully in Figure 6 of the drawings.

When either of the plows is raised, the lever having a hook on its lower end is engaged with the end 18 locking the plow in elevated position, while the other plow is plowing or the reverse, as the case may be or when traveling both plows are locked in the elevated position.

On the top side of the inner leg 22 of the U-shaped member 15 there is a control bar 25 slotted longitudinally to receive the pin 26 of the lifting lever 27.

The lifting lever 27 is pivoted from a cross bar 28 to which a power lift P is attached by a link bar 29 and upwardly extended lever 30.

The plows are regulated for depth of plowing by a control lever 33 mounted to the frame work C near the forward end of the plow and a bell crank lever 34 from the lower end of the control lever 33 is attached to the draw bar 7 by the link 35 to control the elevation of the bar.

Holes 36 in the bar 34 and link 35 provide for various adjustments.

Having thus described my invention I desire to secure by Letters Patent and claim:

A two way plow for tractors comprising an adjustable draw bar mounted ahead and below the rear axle of the tractor; clevises attached to said draw bar; plow beams pivotally attached to the clevises; a control lever mounted to the tractor frame adapted to raise or lower the elevation of the forward end of the plow beams to vary the depth of cut of the plow; opposed moldboard plows mounted on the plow beams; an elongated base mounted on the top of each plow beam; transversely elongated loops mounted on each end of each base; U-shaped lifting members pivotally attached to the tractor frame with the base of the U-shaped members passing through said loops; a power take off mounted in connection with the drive of said tractor; a link extending from said power take off; coacting levers connected to said link adapted to raise either of said plows when the other is in use or both plows while traveling; and locking levers adapted to engage an extended end of said U-shaped lifting members to lock the members and their respective plow in the elevated position.

GOTTLIEB MILLER.